(12) United States Patent
Kinser et al.

(10) Patent No.: US 10,216,008 B2
(45) Date of Patent: Feb. 26, 2019

(54) SACCADE AND VERGENCE TRACKING FOR DISTANCE AUTO FOCUS ADJUSTMENT

(71) Applicant: INTERNATIONAL BUSINESS MACHINES CORPORATION, Armonk, NY (US)

(72) Inventors: Emily R. Kinser, Poughkeepsie, NY (US); John U. Knickerbocker, Monroe, NY (US); Roy R. Yu, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 408 days.

(21) Appl. No.: 14/985,627

(22) Filed: Dec. 31, 2015

(65) Prior Publication Data

US 2017/0192254 A1    Jul. 6, 2017

(51) Int. Cl.
*G02C 7/04* (2006.01)
*B29D 11/00* (2006.01)
*G02C 7/08* (2006.01)

(52) U.S. Cl.
CPC ........ *G02C 7/083* (2013.01); *B29D 11/00028* (2013.01); *B29D 11/00807* (2013.01); *B29D 11/00826* (2013.01); *G02C 7/04* (2013.01)

(58) Field of Classification Search
CPC ...... G02C 7/04; G02C 7/085; G02C 2202/12; G02C 7/041; G02C 7/049; G02C 7/101; G02C 7/02; G02C 7/022; G02C 7/081–7/083; A61B 3/112; A61F 2/1624; G02B 27/0172; G06F 3/013; H04N 13/042; H04N 13/0484; H04N 2202/12; H04N 13/12

USPC .......... 351/159.01, 159.02, 159.03, 159.05, 351/159.14, 159.39, 159.4, 159.41, 351/159.73, 159.74, 158, 219, 246, 351/209–210; 623/6.11
See application file for complete search history.

(56) References Cited

U.S. PATENT DOCUMENTS

| 9,063,351 B1 | 6/2015 | Ho et al. |
| 2002/0016383 A1 | 2/2002 | Iwata et al. |
| 2004/0084790 A1 | 5/2004 | Blum et al. |

(Continued)

FOREIGN PATENT DOCUMENTS

| JP | 20145490918 | 5/2014 |
| JP | 2014168641 | 9/2014 |

(Continued)

OTHER PUBLICATIONS

U.S. Office Action issued in U.S. Appl. No. 15/131,411 dated Mar. 21, 2018, 17 pages.

*Primary Examiner* — Thomas K Pham
*Assistant Examiner* — Alberto J Betancourt
(74) *Attorney, Agent, or Firm* — Tutunjian & Bitetto, P.C.; Erik Johnson (57) ABSTRACT

Lenses and methods for adjusting the focus of a lens include dividing multiple light sensors in a lens into four quadrants. A position of the lens relative to occlusion along a top and bottom edge of the lens is determined based on lengths of bit sequences from light sensors in each of the four quadrants. An optimal focal length for the lens is determined based on the position of the lens. The focal length of the lens is adjusted to match the optimal focal length.

20 Claims, 9 Drawing Sheets

(56) References Cited

U.S. PATENT DOCUMENTS

| | | |
|---|---|---|
| 2013/0261743 A1 | 10/2013 | Humphreys et al. |
| 2014/0081178 A1* | 3/2014 | Pletcher .................. G02C 7/04 600/595 |
| 2014/0185010 A1 | 7/2014 | Bernert et al. |
| 2014/0193045 A1 | 7/2014 | Otis et al. |
| 2014/0232982 A1 | 8/2014 | Iwai |
| 2014/0240655 A1* | 8/2014 | Pugh ....................... G02C 7/04 351/158 |
| 2014/0268014 A1 | 9/2014 | Pugh |
| 2015/0215601 A1 | 7/2015 | Zhou |
| 2015/0362754 A1 | 12/2015 | Etzkorn et al. |

FOREIGN PATENT DOCUMENTS

| | | |
|---|---|---|
| JP | 2014170206 | 9/2014 |
| JP | 2014170209 | 9/2014 |

\* cited by examiner

SACCADE AND VERGENCE TRACKING FOR DISTANCE AUTO FOCUS ADJUSTMENT

BACKGROUND

Technical Field

The present invention relates to correcting presbyopia in contact lenses and, more particularly, to providing automatic bifocal adjustments in a contact lens.

Description of the Related Art

In human binocular vision, the eyes have an involuntary combination of saccade (i.e., scanning), vergence (i.e., convergence/divergence), and lens focus actions motions that are used to find and collect information from objects in the visual field. Contact lenses exist that have the ability to change their focus by changing a tension (and thus a curvature) of the lens. However, determining the focus of the eye alone is not sufficient to determine when, where, and what object to focus on.

SUMMARY

A method for adjusting the focus of a lens includes dividing a plurality of light sensors in a lens into four quadrants. A position of the lens relative to occlusion along a top and bottom edge of the lens is determined based on lengths of bit sequences from light sensors in each of the four quadrants. An optimal focal length for the lens is determined, using a processor, based on the position of the lens. The focal length of the lens is adjusted to match the optimal focal length.

A lens includes a plurality of light sensors around an outer edge of the lens. An optical focus module includes a processor configured to divide a plurality of light sensors in a lens into four quadrants, to determine a position of the lens relative to occlusion along a top and bottom edge of the lens based on lengths of bit sequences from light sensors in each of the four quadrants, and to determine an optimal focal length for the lens based on the position of the lens. A lens focus control is configured to adjust the focal length of the lens to match the optimal focal length.

These and other features and advantages will become apparent from the following detailed description of illustrative embodiments thereof, which is to be read in connection with the accompanying drawings.

DETAILED DESCRIPTION

Embodiments of the present invention track eye movement to determine when, where, and at what object a person's eyes are looking without reference to external points. This information is used to provide a distance of interest from the eye in real time. In combination with a contact lens capable of auto-focus, finding the focal distance helps the lens to achieve a clear visual focus regardless of the object's location and focal distance without any voluntary intervention or adjustment, such as the use of external references and tracking devices.

To accomplish this, the present embodiments line an outside edge of the contact lens with light sensors. As the eye moves, the eyelids cover part of the contact lens and block external light from reaching some of the sensors. Based on which sensors are covered by the eyelid, it is determined which direction the eye is pointing. Taken from both eyes, this information can determine a direction of focus (relating to saccade motion) and a distance of focus (relating to vergence). This information is then used to adjust the lens and achieve a clear focus. The focal distance can also be changed voluntarily by using pre-determined signals, such as double blinking, looking up/down in a pattern, etc. These signals should be selected from motions that are unnatural or uncommon in everyday use.

Figure 1:
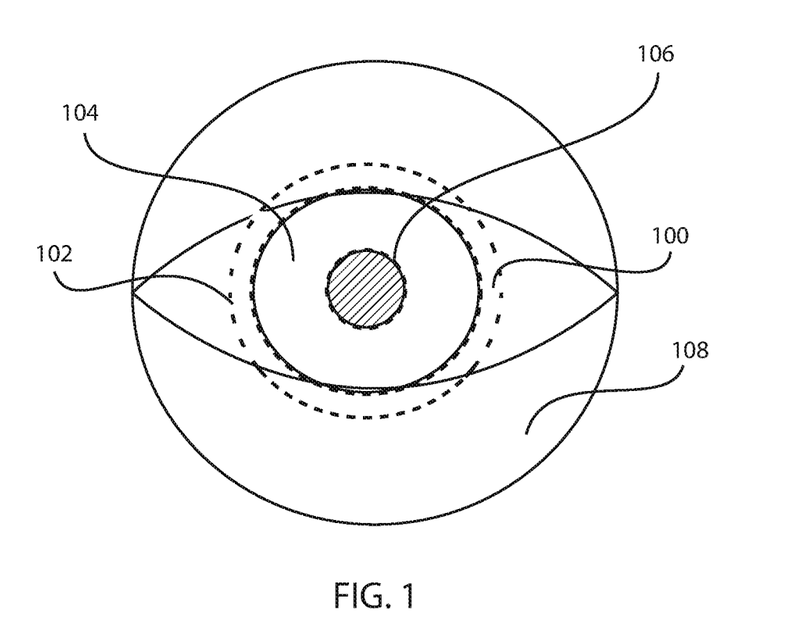
FIG. 1 is a diagram of a lens positioned on an eye that is looking straight ahead in accordance with the present principles.

Referring now to the drawings in which like numerals represent the same or similar elements and initially to FIG. 1, an exemplary embodiment of a contact lens 100 is shown having a ring of light sensors 102 around its outer edge. The lens covers the iris 104 and pupil 106 of the eye to ensure that it is large enough to provide correction at any degree of dilation. Some of the sensors 102 are covered by the eyelids 108, while others are exposed to external light. The sensors may be divided into quadrants, for example labeled "top," "bottom," "left," and "right."

It is specifically contemplated that the light sensors 102 are highly transparent photosensors. Photosensors are available in extremely small form factors, and it is particularly contemplated that the light sensors 102 may be implemented as organic solar cells that generate a voltage when exposed to light. In this manner, exposed sensors 102 can be differentiated from sensors 102 that are covered by the eyelids 108 by measuring a voltage output by each sensor 102. The light sensors may be formed from, e.g., crystalline silicon, amorphous silicon, organic film, or perovskite solar cells. The shape of each sensor 102 may be, e.g., square, rectangular, oblong, or trapezoid and may be selected to maximize the light capture area.

In one particular embodiment, the contact lens 100 may have a diameter of about 1 cm to about 1.5 cm, slightly larger than iris, with about 500 to about 1000 sensors 102 along the outside edge of the lens 100. Each sensor 102 may have a linear size of about 30 μm to about 60 μm along the circumference of the lens 100. The cells can have larger size (100 um-500 um) in the radius direction of the lens to increase the light receiving surface area.

When the sensors 102 are positioned over an eye, some of the sensors may be covered by the eyelid. This partitions the sensors into four quadrants, with a top and bottom quadrant being covered by the eyelid and a left and right quadrant being uncovered. The present embodiments determine the length of each quadrant as the number of sensors 102 in a continuous chain or segment that are either all lit or all dark. In one example, a person who is surprised may have only a few sensors 102 that are covered by the eyelids at the top and bottom, with long chains of sensors 102 being lit on the left and right. In contrast, a person who is squinting would have only a few sensors 102 that are uncovered at the left and right, with long chains of sensors 102 being covered by the eyelids.

This information is used to determine the eye's viewing direction and eyelid positions. In particular, tracking the differences between, e.g., the left and right quadrants gives information regarding whether the eye is pointed to the left or to the right, while tracking differences between the top and bottom quadrants gives information regarding whether the eye is pointed up or down. A blink can be tracked using the sums of top plus bottom and left plus right.

Figure 2:
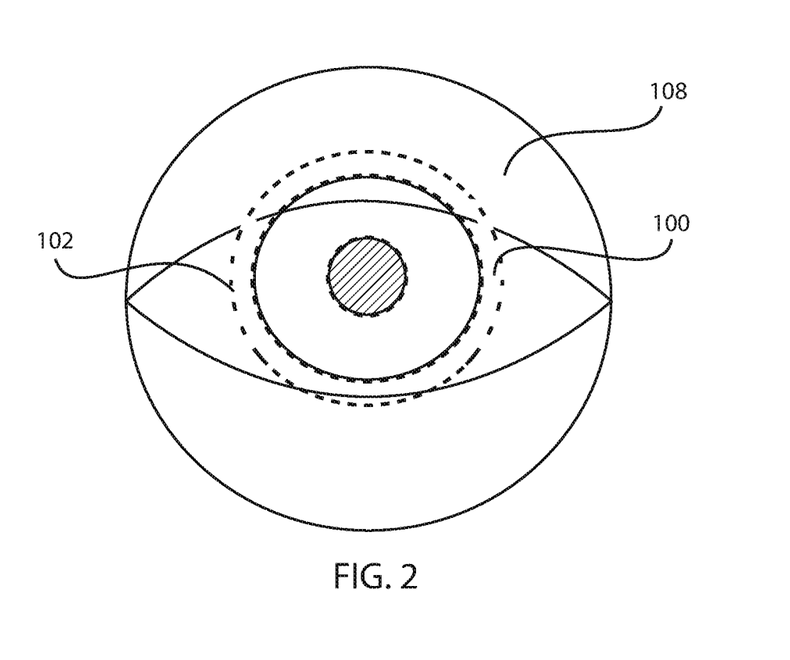
FIG. 2 is a diagram of a lens positioned on an eye that is looking upward in accordance with the present principles.

Referring now to FIG. 2, the contact lens 100 is shown on an eye that is looking upwards. In this example, a different set of sensors 102 is exposed and a different set is covered by the upper eyelid 108. More sensors 102 on the upper half of the eye are covered, while more sensors 102 on the lower half of the eye are exposed. As a result, the pattern of voltages (i.e., the number of cells in top and bottom segments receiving light, or number of "lit" cells, in the top and bottom quadrants) created by the sensors 102 will be different in a manner that is characteristic of looking upward.

Figure 3:
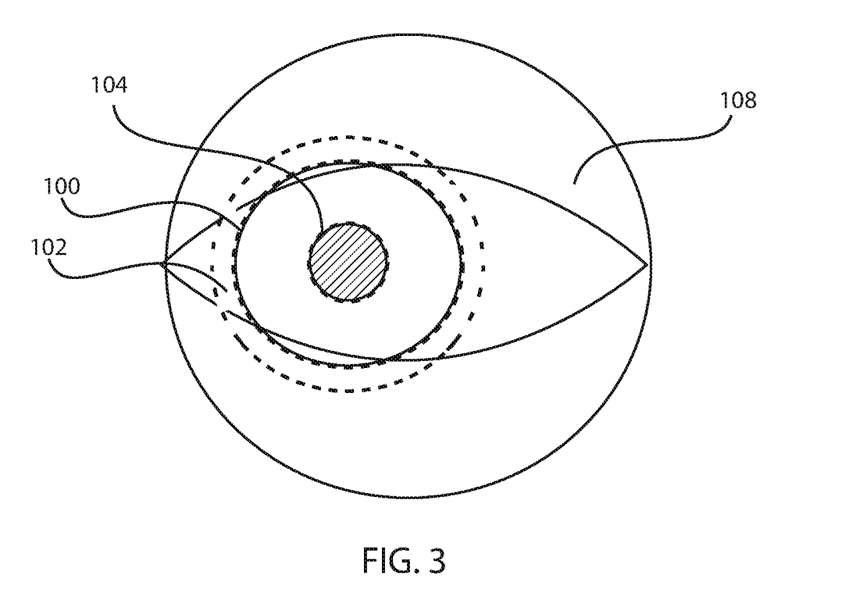
FIG. 3 is a diagram of a lens positioned on an eye that is looking to one side in accordance with the present principles.

Referring now to FIG. 3, the contact lens 100 is shown on an eye that is looking to the left. In this example, a different set of sensors 102 will be exposed, with more sensors 102 on the right side of the eye being exposed and more sensors 102 on the left side of the eye being covered by the eyelids 108. As a result, the pattern of voltages created by the sensors 102 will be different in a manner that is characteristic of looking to the left. In one example, the pattern is a set of four segments of a bitstream, "11111 . . . 00000 . . . 11111 . . . 00000 . . . ," with the lengths of each segment representing the number of sensors 102 that are lit ("1") or occluded ("0").

Figure 4:
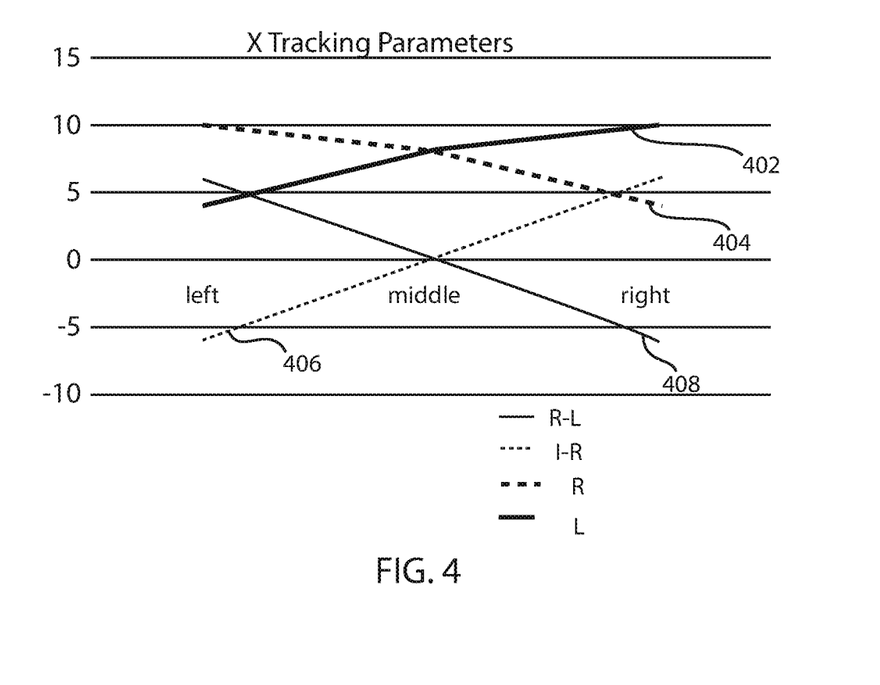
FIG. 4 is a graph of tracking parameters for a lens's motion from left to right in accordance with the present principles.

Referring now to FIG. 4, a graph is shown illustrating the relationship between the left and right quadrants. The x-axis represents eye direction, from left to right. The y-axis represents a number of sensors 102 that are lit at each position. When the eye is pointing to the left, the number of sensors 102 on the left quadrant (shown by line 402) is lower, as more sensors are covered by the side of the eyelids, while the number of sensors 102 on the right quadrant (shown by line 404) is higher, as this quadrant pulls toward the center and a wider opening between the eyelids is available. Two additional lines are shown, L-R 406 and R-L 408. These lines represent the differences between the number of sensors 102 in the left and right quadrants. As the eye moves from left to right, the L-R line 406 has a steady increase, while the R-L line 408 has a steady decrease. Notably, the L-R line 406 and R-L line 408 track eye motion in a manner that is not susceptible to blinks. As the eyelids close, the left and right quadrants are diminished by a similar ratio, leaving the ratio of the differences between the quadrants to the total sum of the quadrants unaffected.

Figure 5:
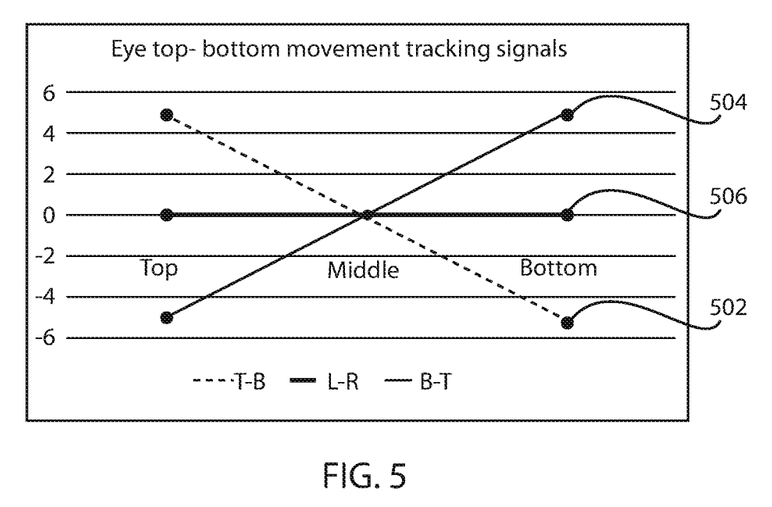
FIG. 5 is a graph tracking parameters for a lens's motion from top to bottom in accordance with the present principles.

Referring now to FIG. 5, a graph is shown illustrating the relationship between the top and bottom quadrants. The x-axis represents eye direction, from top to bottom. The Y-axis represents a number of sensors 102 that are lit. When the eye is pointing upward, the number of sensors 102 on the top quadrant is lower, as more sensors are covered by the top eyelid, while the number of sensors 102 on the bottom quadrant is higher, as this quadrant pulls above the bottom eyelid. The top and bottom quadrants track the number of "un-lit" or "0" cells. So when looking, up the length of the chain of "00000 . . . 00" increases in top quadrant and decrease in bottom quadrant. In the left and right quadrants, the number of "lit" or "111111 . . . 1" cells is tracked. The graph shows lines that describe differences between top and bottom quadrants, T-B 502 and B-T 504. As the eye moves from top to bottom, the T-B line 502 has a steady decrease and the B-T line 504 has a steady increase. Also shown is the L-R line 506, which does not vary with vertical movements of the eye.

By tracking information from both lateral and vertical motion of the eye, complex motions can be mapped and recognized. For example, if users roll their eyes, this will produce a characteristic change in the tracking parameters for both vertical and horizontal motion, and such a pattern can be easily matched to known motion patterns.

When a sudden rotation change in the position of top/bottom, and left/right quadrants is detected, this can indicate the wearer is laying down on the side. Some un-natural eye movement, like double and triple blinks can be used as input to the processor to change the lens focus to near or far fields by certain increments.

Figure 6:
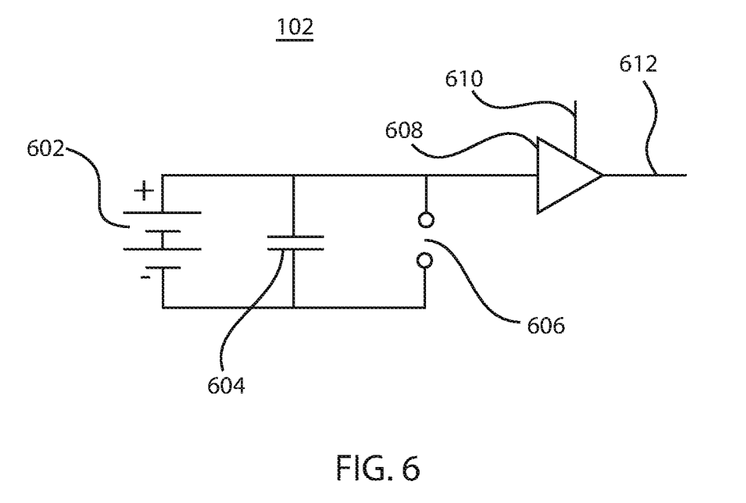
FIG. 6 is a diagram of a light sensor in accordance with the present principles.

Referring now to FIG. 6, a schematic of a light sensor 102 is shown. A photocell 602 receives light energy and converts that energy to a voltage and current. In one exemplary embodiment, the photocell 602 may produce an output current of about 50 μA/mm$^2$ when in direct sunlight and about 1-5 μA/mm$^2$ from indoor light, each at a voltage of about 1V (with a range of about 0.5 V to about 1 V, depending on cell type). When covered by a user's eyelid 108, this output current drops significantly.

The sensor 102 includes a super capacitor 604 and a load 606. The charge produced by the photocell 602 is held in the capacitor 604, which holds the voltage at a proper level to match the output needs of the cell 602. Excess charge is drained through the load 606. The super capacitor 604 and the load 606 thereby maintain the proper voltage and current output needed for the photocell to operate correctly. When the photocell 602 is unlit, the energy is drained out the load 606 so that the photocell 602 reads as "off." The photocell's power output can be used, for example, to charge an on-lens rechargeable battery.

A latch 608, which may for example be a flip-flop pass through circuit, stores a logical output from the photosensor 602 responsive to an enabling signal 610 from a controller and the input. The enabling signal may be, for example, a clock that triggers a digital read. In one example, the clock may have a frequency of 100 kHz (reading, e.g., 1000 bits 100 times per seconds) with a signal duration of, e.g., 1 μs. During this 1 μs "reading period," if there is a voltage on capacitor 604 (i.e., if there is light on the photocell 602), then an "on" signal will be passed from capacitor 604 through the latch 608 and to the output 612. If at one point the photocell 602 has a low output (i.e., if there is no or low light on the photocell 602), the load 606 will drain the charge within the 10 µs interval between clock pulses. During the next read, the latch 608 will read an off, and continue to read "off" every 10 µs until the photocell receives light again. Thus the output 612 is a digital "on/off" indicator of the photocell "on/off" state held by capacitor 604, with reading rate being controlled by clock 610. The latch 608 provides an output 612 that represents the stored signal and may be used, in conjunction with the outputs 612 of other sensors 102, to determine a direction of the user's eye.

The individual sensors 102 (e.g., 1, 0) are read into a parallel/serial shift circuit that takes the readings of each of the sensors 102 (e.g., 1,000 readings) at once and produces a serial or parallel output word that encodes a collective binary response (e.g., a 1 kilobit word "111111 . . . 000000 . . . 111111 . . . 000000") from each of the sensors 102 in lens 100. The number of 1's in the left/right quadrants and the number of 0's in the top/bottom quadrants is determined. Based on the relative numbers, positions, and time-dependence of the segments, eye positions and movements are determined.

Figure 7:
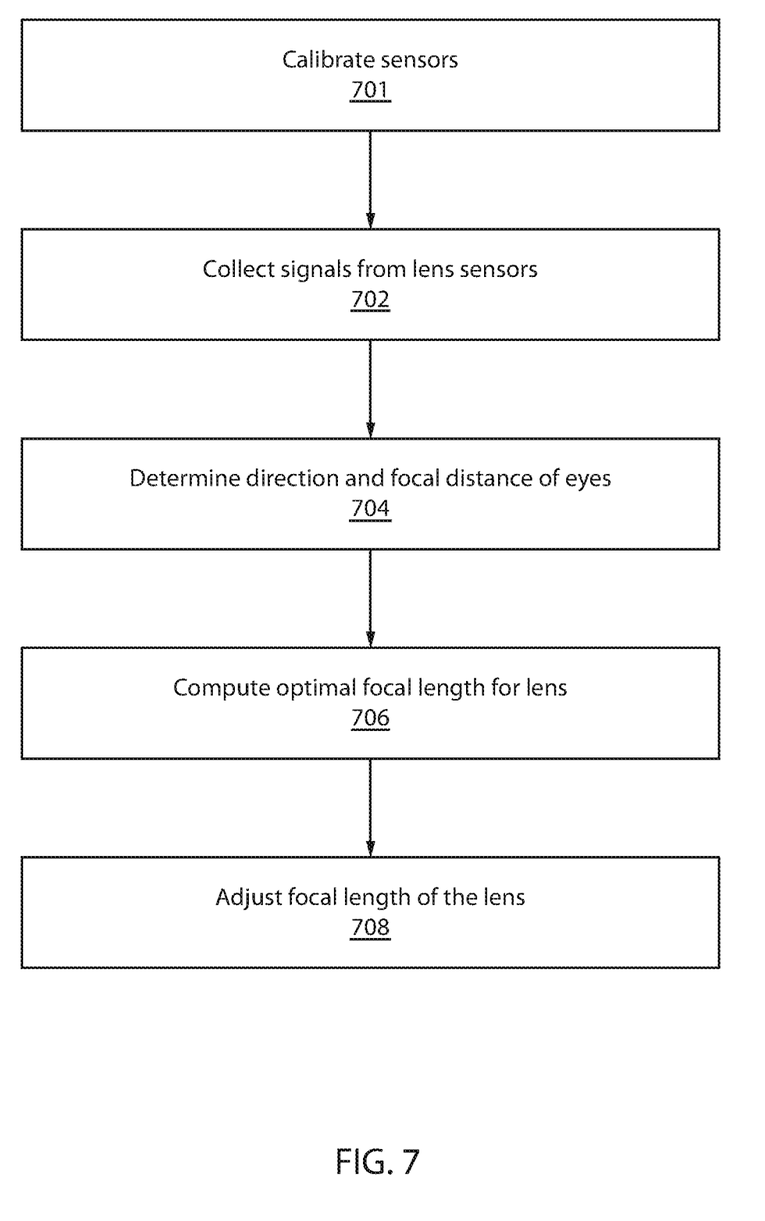
FIG. 7 is a block/flow diagram of a method of adjusting the focal length of a lens in accordance with the present principles.

Referring now to FIG. 7, a method for lens focus control is shown. Block 701 calibrates the sensors, taking into account lens rotation, lens centrality, and nose-temple asymmetry. Block 702 collects signals from lens sensors 102, using the clock signal 610 to trigger the latch 608 and access a logical value that reflects whether the sensor 102 is illuminated above a threshold value. Block 702 reads all the sensor bits and converts the data into data word with a bandwidth of the number of cells in the lens (e.g., 1000 bits). Other sizes of word are also possible. Block 704 then determines a direction and focal distance of the eyes based on the signals from sensors 702. In a passive mode, where each lens 100 is independent from the other, certain unnatural eye movements, such as double/triple blinks, can be used to signal to the lens processor to increase/decrease focal length by certain increments. Alternatively, in an active mode, where the lenses 100 can communicate, Block 704 may take advantage of wireless communications between the lenses 100, or between the lenses 100 and a central system, to additionally obtain vergence information based on the relative directions of the eyes. Block 706 uses the direction and focal distance of the eyes to determine an optimal focal length for the lens 100, taking into account information regarding the user's eyes, either 704. In particular, the optimal focal length for the lens 100 combines with the lens of the user's eye to provide clear vision at the eyes' focal distance. Block 708 then adjusts the focal length of the lens 100 to provide the optical focal length. The focal adjustment is automatic in such cases and no user input is necessary.

When a lens 100 is placed onto an eye, the lens automatically centers to the iris/pupil of the eye. However, there may be up to, e.g., a 0.5 mm distance between the center of the lens 100 and the true center of the eye due to differences in lens quality and a shape mismatch with the eye. The lens 100 can also rotate from its ideal position, so that sensors 102 will not be perfectly aligned with expected start and end point. In addition, the lens 100 can be placed on either the left or the right eye. Block 701 determines and corrects for these offsets based on a preliminary reading from the four light quadrants and their time-dependent behavior. The calibration of block 701 is discussed in greater detail below.

Once each eye's position for direct viewing (straight ahead at far-field) have been calibrated, the position where the eyes are focused can be determined in block 706. Assuming the eyes are looking at target located a distance L away the viewing angle for each eye is determined as a difference from looking straight ahead. The ratio of the distance between the eyes (D) to the difference between the two eyes' viewing angles ($\alpha$), $D/\alpha$, gives the distance L to the target. The angle $\alpha$ for each eye can further be calculated from the pupil displacement, based on the length difference between bit chains for the left and right quadrants, and projected onto a horizontal axis, divided by the radius of the eyeball r.

Once the focus distance is determined, the focus length data is sent to each lens 100 to adjust the focus distance. In one embodiment, focus distance can be adjusted using liquid lens technology. In this method, a bilayer liquid (wafer/oil) is capped between two glass plates acting as parallel voltage plates. As the voltage changes, the bilayer interface changes from concave to convex depending on the voltage applied. This in turn changes the focal length of the lens 100. In an alternative embodiment, liquid crystal is used instead of a bilayer liquid. The liquid crystal used for display can be made to the size of pupil (e.g., about 3 mm to about 5 mm), at a thickness of about 100 µm. Under normal voltage, the light can pass straight through. When the voltage is raised, the index of refraction of the crystal is increased, due to the liquid crystal molecules' rearrangement. The liquid crystal then acts as a lens, although the physical thickness remains the same.

In one example, when the eyes are aimed downward, block 704 may determine that the user is focusing on a book or other nearby object. Block 706 may then determine that the optimal focal length is quite close. This produces the effect of bifocal correction within the lens 100, allowing a user to focus easily on far-away objects and then switch to a different focal length for nearby objects, which may be helpful for users who have presbyopia.

The information gleaned by block 704 may be used to provide additional information about the user's state. For example, the sensor information may indicate the user's emotions (e.g., whether the user is smiling, surprised, staring, squinting, etc.) or physical condition (e.g., standing, sleeping, blinking). In addition, this information helps track the user's attention without being impacted by head and body movements, which is a problem when using accelerometers for that task. Tracking the user's emotional and physical state may be helpful for clinical studies and experimental therapies to determine how emotions or physical activities affect the outcome.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C)

only, or the selection of all three options (A and B and C). This may be extended, as readily apparent by one of ordinary skill in this and related arts, for as many items listed.

Figure 8:
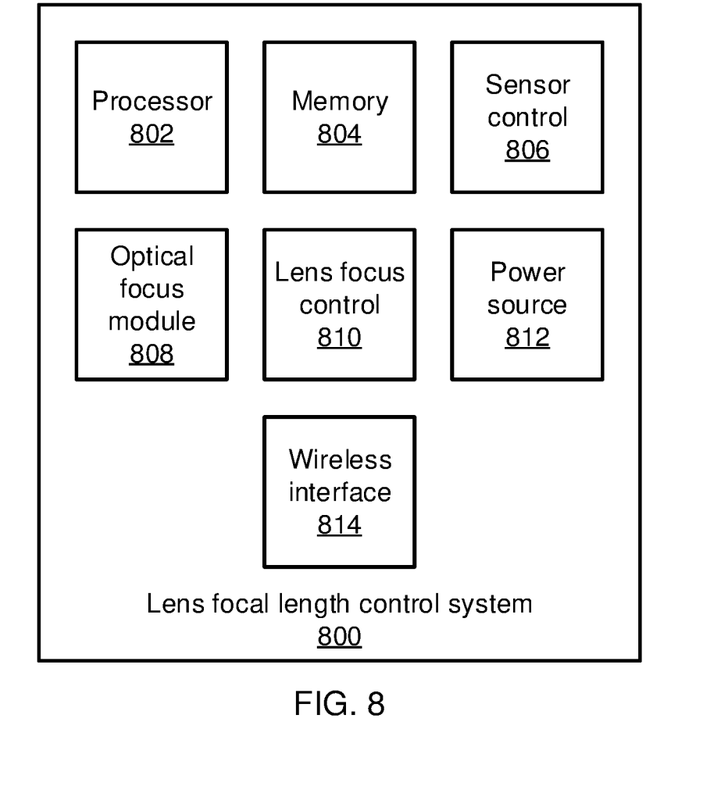
FIG. 8 is a block diagram of a system for adjusting the focal length of a lens in accordance with the present principles.

Referring now to FIG. 8, a system 800 for adjusting the focal length of a lens is shown. In one particular embodiment, the system 800 is embedded in the lens 100 itself and directly receives information from the sensors 102. The system 800 includes a hardware processor 802 and a memory 804. Due to the physical constraints of the lens 100, it is expected that the processor 802 and memory 804 may be relatively limited in processing power and may be special-purpose components. In particular, the system 800 implements a number of functional components which may be implemented integrally with the processor 802. In one embodiment, the functional components are implemented as software on the processor 802, while in another they are implemented as one or more discrete hardware components in the form of, e.g., application-specific integrated chips or field-programmable gate arrays.

The system 800 includes a sensor control 806. The sensor control 806 operates the sensors 102 by applying an enable signal 610 and receives an output 612 that may be stored in memory 804. Using the sensor outputs 612, an optical focus module 808 computes the optimal focus length for the lens 100 based on a direction and focal distance of the eyes as well as stored information about the eyes. A lens focus control then adjusts the focal length of the lens. These computations and actions are powered by a power source 812, which may be stored power, may derive directly from the photovoltaic currents generated by the sensors 102, or may be bioelectrical in nature. A wireless interface 814 provides communication of information between the eyes, making it possible to determine vergence based on the direction of both eyes.

In one particular embodiment, the power source 812 derives from the photocells 602 of the sensors 102. When there is no available light (and hence no power source), corrections to the lens focal length are unnecessary, and so the power draw is zero. During processing, the processor 802 may use, for example, about 0.1 mW of power. Meanwhile, the total power generated by the photocells 602 may be, for example, 1 µA per cell times 1000 cells per lens 100, for a total of about 0.1 mW. Thus, even in relatively low ambient light conditions, power generated by the photosensors 602 is sufficient to run the system 600. In an alternative embodiment, the lens 100 may be placed in a wireless charging station. When the lens 100 is not in use, the power source 812 may then charge.

Figure 9:
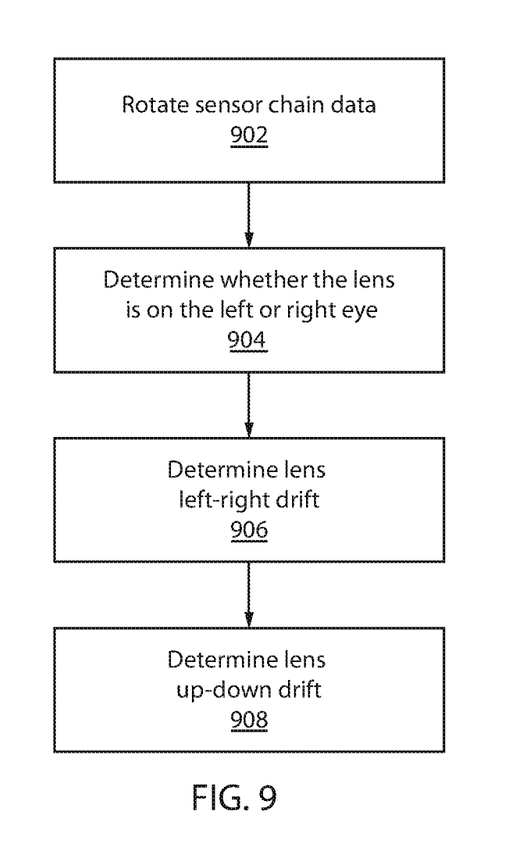
FIG. 9 is a block/flow diagram of a method of calibrating light sensors in accordance with the present principles.

Referring now to FIG. 9, additional detail is provided on the calibration of sensors 102 in block 701. After applying a lens 100 to an eye, block 902 rotates the sensor chain data to account for the angular position of the eye. Block 902 takes a preliminary reading of the four quadrants (initially set at arbitrary positions) with the user looking straight ahead or looking at an object from several pre-determined distances. Block 902 finds the center line of the sequence of sensor values, which is not always aligned with the light sensor start/stop position. Block 902 rotates the data by a fixed number of bits to put the center of the data at the center of the eye, such that the center of the data and the center of the eye are in alignment. The rotation may subsequently be adjusted if a shift in lens rotation $\Delta\theta$ is detected.

Block 904 determines whether the lens 100 is on the left or right eye. Block 904 compares the number of bits in left and right sensor bit sequences. For a typical human eye, the side of the eye nearer to the nose is almost always slightly smaller than the side of the eye toward the temple. This information is then used by block 904 to determine which eye the lens 100 is worn in and by block 906 to determine any drift $\Delta y$ present. Block 908 similarly notes that the top eyelid is generally more round than the bottom eyelid. As the eye blinks, the top photocell bit chain length will change in a slightly different manner from that of the bottom cell photocell bit chain. Block 908 uses this information to determine the up-down drift of the lens $\Delta x$.

Figure 10:
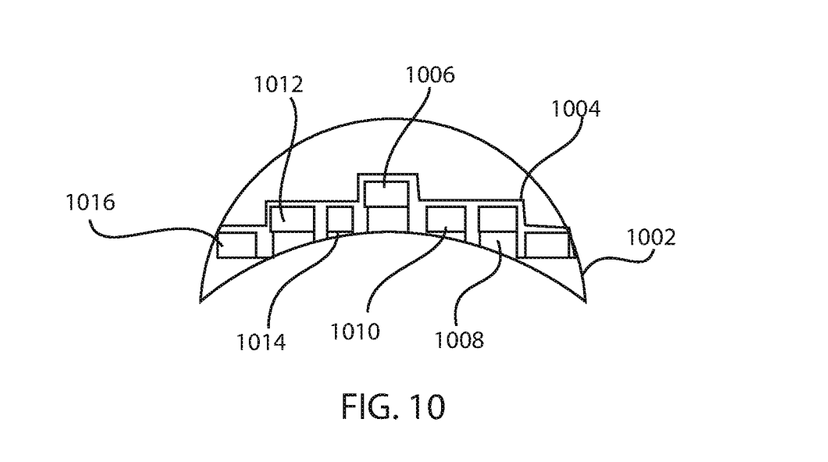
FIG. 10 is a cross-sectional diagram of a lens including a system for adjusting the focal length of the lens in accordance with the present principles.

Referring now to FIG. 10, a diagram of a lens 1002 is shown with components embedded, having been formed by placing components on a substrate and polishing. The components are sealed using a sealing layer 1004. The lens 1002 includes a focus control 1006. A wireless interface 1008 is in communication with a processor 1010, powered by a battery 1012 and charger 1014. A ring of sensors 1016 is positioned around the outer edge of the lens 1002. After positioning and sealing the components, a top substrate is deposited and layers are polished down to form the curvature of the lens.

Figure 11:
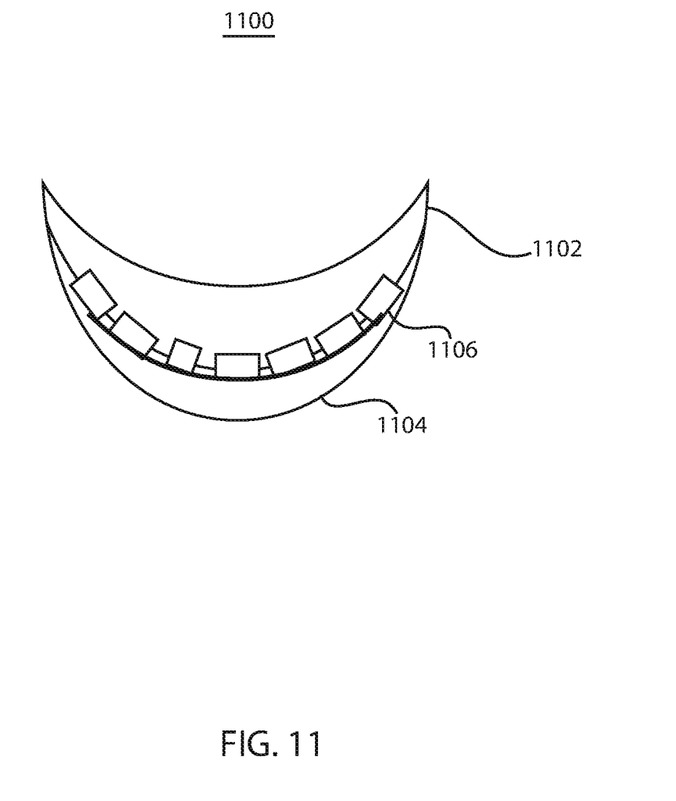
FIG. 11 is a cross-sectional diagram of a lens including a system for adjusting the focal length of the lens in accordance with the present principles.

Referring now to FIG. 11, a diagram of a lens 1100 is shown with components embedded, having been formed by placing the components 1106 on a mold with the lens 1100 being formed around them. In this embodiment, the lens 1100 includes a back layer 1102 and a front layer 1104 formed separately around the components 1106 as described below.

Figure 12:
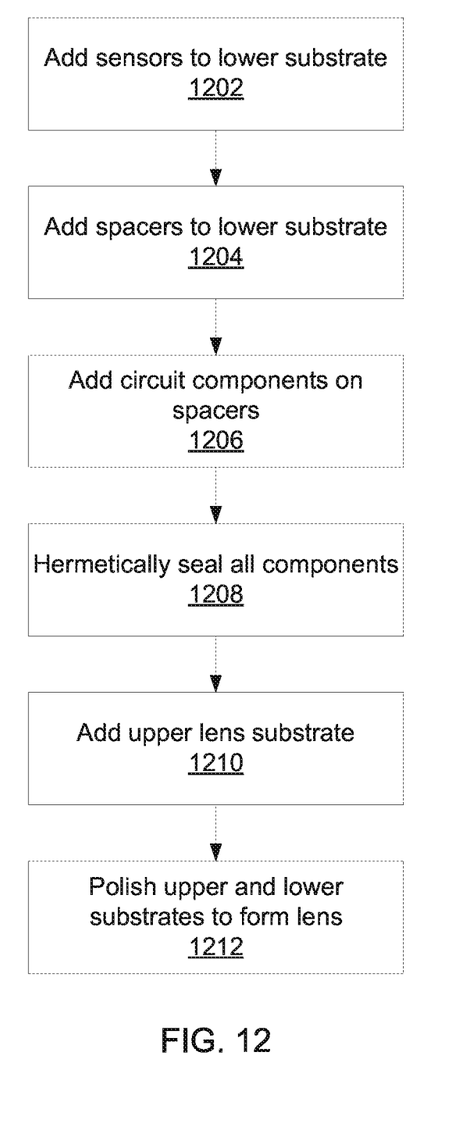
FIG. 12 is a block/flow diagram of a method of forming a lens in accordance with the present principles.

Referring now to FIG. 12, a method of forming a lens 1002 by polishing is shown. Block 1202 adds sensors 1016 to a lower substrate layer. Block 1204 adds spacers to the lower substrate, with higher spacers toward the middle of the lens area, to match the expected curvature of the lens. Block 1206 then adds circuit components, such as the focus control 1006, wireless interface 1008, processor 1010, battery 1012, and charger 1014, with any appropriate connections between them, by placing the circuit components on respective spacers. Block 1208 hermetically seals all of the components and sensors 1016 using a clear sealing layer 1004. Block 1210 then adds an upper lens substrate over the sealing layer 1004 and block 1212 polishes the upper and lower substrates to form the lens curvature around the sensors 1016 and other components, as shown in FIG. 10. In an alternative embodiment, the upper substrate in lens 1210 may be formed by molding, such that it already has the appropriate curvature. In this embodiment, no polishing of the upper substrate is needed in block 1212.

Figure 13:
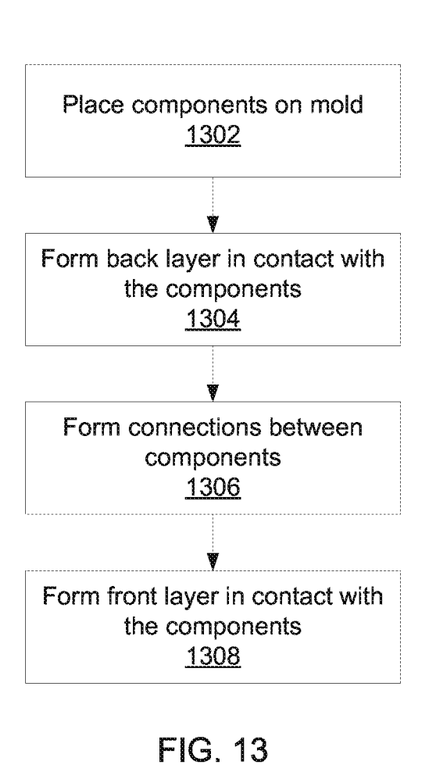
FIG. 13 is a block/flow diagram of a method of forming a lens in accordance with the present principles.

Referring now to FIG. 13, a method of forming a lens 1100 by molding is shown. Block 1302 places the components 1106, including circuit components and sensors, onto a mold or jig, with the small components being held in place by a vacuum. The back layer 1102 is then molded over the components 1106, with a curvature appropriate for fitting to a user's eye. Block 1306 forms appropriate electrical connections between the components 1106 and block 1308 forms a front layer 1104 over the components with a curvature appropriate for the desired degree of correction for the user's eye.

Having described preferred embodiments of saccade and vergence tracking for distance auto-focus adjustment (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for adjusting the focus of a lens, comprising:
dividing a plurality of light sensors in a lens into four quadrants;
determining a position of the lens relative to occlusion along a top and bottom edge of the lens based on numbers of bits in respective bit sequences from light sensors in each of the four quadrants;
determining an optimal focal length for the lens, using a processor, based on the position of the lens; and
adjusting the focal length of the lens to match the optimal focal length.

2. The method of claim 1, wherein determining the optimal focal length of the lens comprises determining a direction of the lens based on identifying which light sensors register a high amount of light and which light sensors register a low amount of light.

3. The method of claim 2, wherein determining the optimal focal length of the lens comprises determining an optimal focal length when the lens is directed downward that is shorter than an optimal focal length when the lens is directed forward or upward.

4. The method of claim 3, wherein determining the optimal focal length of the lens comprises determining that the lens is directed downward if a number of light sensors on a lower edge of the lens in a low light state is greater than a number of light sensors on the lower edge of the lens that are in a low light state when the lens is directed forward.

5. The method of claim 1, wherein determining the optimal focal length for the lens comprises powering the processor using power generated by the light sensors.

6. The method of claim 1, wherein determining the optimal focal length for the lens comprises determining a vergence of the lens and a second lens based on the positions of each lens.

7. The method of claim 1, further comprising wirelessly communicating the position of the lens to a second lens for determination of vergence.

8. The method of claim 1, wherein dividing the plurality of light sensors in a lens into four quadrants comprises rotating a bit sequence that represents all of the plurality of sensors to align with the center of an eye.

9. The method of claim 1, wherein determining the position of the lens comprises determining drift of the lens away from a center point, wherein the position of the lens corrects for the determined drift.

10. The method of claim 1, wherein adjusting the focal length of the lens is triggered by a predetermined pattern of change in the position of the lens or a predetermined pattern of occlusion.

11. A lens, comprising:
a plurality of light sensors around an outer edge of the lens;
an optical focus module, comprising a processor configured to divide a plurality of light sensors in a lens into four quadrants, to determine a position of the lens relative to occlusion along a top and bottom edge of the lens based on numbers of bits in respective bit sequences from light sensors in each of the four quadrants, and to determine an optimal focal length for the lens based on the position of the lens; and
a lens focus control configured to adjust the focal length of the lens to match the optimal focal length.

12. The lens of claim 11, wherein the optical focus module is further configured to determine a direction of the lens based on identifying which light sensors register a high amount of light and which light sensors register a low amount of light.

13. The lens of claim 12, wherein the optical focus module is further configured to determine an optimal focal length when the lens is directed downward that is shorter than an optimal focal length when the lens is directed forward or upward.

14. The lens of claim 13, wherein the optical focus module is further configured to determine that the lens is directed downward if a number of light sensors on a lower edge of the lens in a low light state is greater than a number of light sensors on the lower edge of the lens that are in a low light state when the lens is directed forward.

15. The lens of claim 11, further comprising a power source configured to use power generated by the light sensors.

16. The lens of claim 11, wherein the optical focus module is further configured to determine a vergence of the lens and a second lens based on the positions of each lens.

17. The lens of claim 11, further comprising a wireless interface configured to wirelessly communicate the position of the lens to a second lens for determination of vergence.

18. The lens of claim 11, wherein the optical focus module is further configured to rotate a bit sequence that represents all of the plurality of sensors to align with the center of an eye.

19. The lens of claim 11, wherein the optical focus module is further configured to determine drift of the lens away from a center point, wherein the position of the lens corrects for the determined drift.

20. The lens of claim 11, wherein the lens focus control is further configured to adjust the focal length of the lens when triggered by a predetermined pattern of change in the position of the lens or a predetermined pattern of occlusion.

* * * * *